Feb. 27, 1968  SHINZO TAMAKI ET AL  3,370,615
PIPE END PROTECTING RING
Filed July 30, 1964
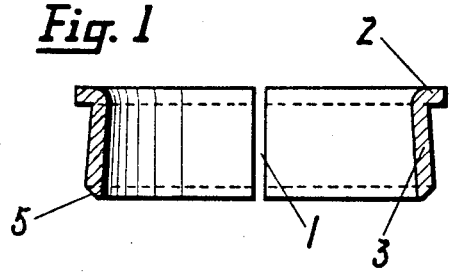
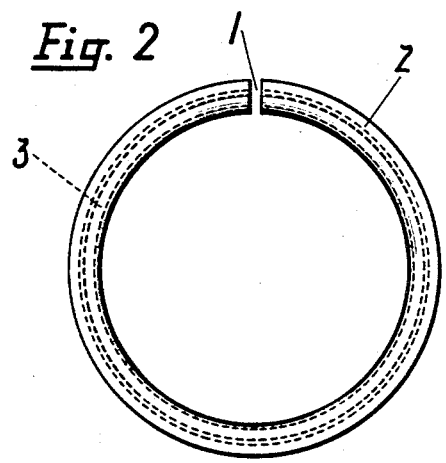
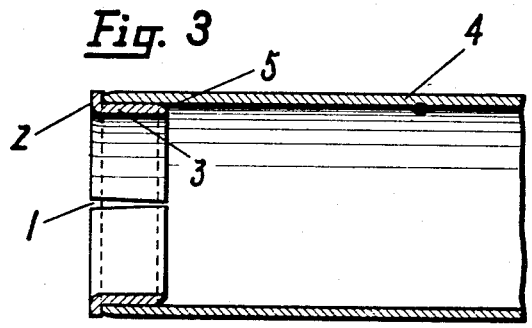
INVENTORS
Shinzo Tamaki
Tamotsu Kurimoto
Akihiko Okita
BY Watson, Cole, Grindle & Watson
ATTORNEYS

United States Patent Office 3,370,615
Patented Feb. 27, 1968

3,370,615
PIPE END PROTECTING RING
Shinzo Tamaki, Tamotsu Kurimoto, and Akihiko Okita, Wakayama, Japan, assignors to Sumitomo Metal Industries Limited, Osaka, Japan, a corporation of Japan
Filed July 30, 1964, Ser. No. 386,190
Claims priority, application Japan, Aug. 3, 1963, 38/58,696
6 Claims. (Cl. 138—96)

This invention relates to protecting rings for protecting the ends of thin walled pipes.

In order to protect the end of thin walled pipe, wooden pieces as combined in a cross have been heretofore fitted in the pipe end. In such case, the wooden pieces will serve to prevent the parts with which they are in contact from becoming elliptic but will not be able to prevent the entire periphery of the pipe end from becoming elliptic and protect the pipe end surface.

According to the present invention, a ring having an outside diameter of substantially the same dimension as of the inside diameter of a pipe to be protected is cut and opened in a part to form a slit, has an outwardly projecting flange formed at one end, is bevelled at the other end and the body portion or ring proper is tapered so as to be of a larger diameter at the other end.

An object of the present invention is to provide a protecting ring for preventing the end of a pipe from becoming elliptic and for protecting the bevelled part of the pipe end.

Another object of the present invention is to provide a protecting ring which is prevented from dropping by the spring action by the tapered part of the ring proper and the slit.

A further object of the present invention is to provide a protecting ring which is easy to fit into and remove from a pipe to be protected.

A still further object of the present invention is to provide a pipe end protecting ring for the preparation of which waste steel pipes can be reduced and which is simple to make.

In the accompanying drawings:

FIGURE 1 is a transverse section of a pipe end protecting ring according to the present invention.

FIGURE 2 is a plan view of FIGURE 1.

FIGURE 3 is a longitudinal section of a pipe end protecting ring according to the present invention as fitted in a pipe end.

In the present invention, metal pipe made of steel and having the outer diameter substantially equal to the inner diameter of the pipe to be protected, is cut into a ring of a required length and the ring is bent outward at right angles one end to form a flange 2, is tapered on a ring proper 3 so as to be of a larger diameter than the other end, is bevelled on the outside at 5 at the other end, and is cut and opened axially in parallel to form a slit 1 on the flange 2 and the ring proper 3. In such case, the outer diameter of the flange 2 as fitted to a pipe end is made slightly less than the outer diameter of a pipe 4 to be protected, the outer diameter of an end 6 having the smallest diameter of the ring proper 3 of the ring is made equal to the inner diameter of the pipe 4 and the ring proper 3 has a taper of from 1 in 10 to 1 in 40.

In applying the protecting ring according to the present invention, if the ring is inserted into the pipe 4 by being compressed on the ring proper 3, it will be fixed with the tapered outer perpheral parallel part 3 having a spring action by virtue of the slit 1 being pressed against the inside surface of the pipe 4 so that the pipe may be prevented from becoming elliptic and the flange 2 will completely cover the pipe end surface so that the bevelled part at the pipe end may be also protected.

It has been found that, when the protecting ring according to the present invention is applied to a thin walled pipe or specifically a line pipe of a diameter of 4 to 36 inches and $t/D$ is 0.5 to 3% wherein $t$ is the thickness and D is the diameter, it will be very effective to prevent the deformation of the pipe end.

The slit made in the protecting ring according to the present invention being parallel with the axis of said protecting ring, is provided in order to produce a spring action.

The dimension of the slit is determined by the tapered degree and is the difference between the periphral lengths at both ends of the ring proper due to the taper or in other words $\pi$ times the difference between the maximum and minimum diameters of the body portion of the ring. The peripheral length of the ring proper at the small end of the ring must be made equal to the peripheral length of the inner periphery of the pipe to be protected. Therefore, when the ring is fitted into the pipe to be protected, the largest end part of the tapered protecting ring will first come into contact at the slit to contract it. The flange of the protecting ring according to the present invention must be of such dimension as will protect the bevelled part and root face of the pipe to be protected and will not allow the flange to protrude out of the outer peripheral surface of the pipe. It is most preferable that the dimension of the flange should be such that (the outside diameter of the pipe to be protected) minus (the outside diameter of the flange)=0.079 to 0.157 inch.

Further, the taper of the protecting ring according to the present invention is important to give a spring effect in cooperation with the slit and must be of such dimension that the ring will well spring back when fitted in the pipe end to be protected. It has been found that in case the tapered degree is higher than 1/10, it will be difficult to fit the ring and that in case the tapered degree is lower than 1/40, the spring effect will be low. Therefore, the tapered degree is 1/10 to 1/40 but the tapered degree of the highest spring effect is 1/10 to 1/20.

The length of the protecting ring may be such as can allow a necessary taper to be applied. But it is needless to say that the protecting ring must have such length as is required to perform the duty of protecting the pipe end against shocks from outside when the ring is fitted in the pipe end. In case the length of the ring is less than 15% of the outside diameter of the pipe to be protected, the ring will be apt to be removed and the protecting effect will be low. When it is more than 40%, it will be difficult to handle the collar. It is most preferable that the length of the ring is 15 to 40% of the diameter of the pipe to be protected.

The inside diameter at the largest end of the taper of the protecting ring before the slit is made must be smaller than the inside diameter of the pipe to be protected and the thickness of the collar must be such that the collar will not be deformed by shocks. It is preferable that the thickness of the collar is such that the lower end of the bevelled part can enter the pipe to be protected. According to experiments, the thickness of the collar must be ½ to 2 times as large as the thickness of the pipe to be protected.

Steel is proper as a material to be used for the protecting ring according to the present invention.

However, any material which can be worked as required, has a spring action and is high in strength can be used.

The protecting ring according to the present invention may be made for not only a steel tube but also a steel plate by bending it to form a ring-shape.

What is claimed is:

1. A removable pipe end protecting ring for protecting the end of a thin-walled pipe from damage and becoming elliptical, comprising a cylindrical body portion for insertion into the open end of said pipe and an outwardly projecting peripheral flange formed on one end of said cylindrical body portion to overlie and protect the extreme end of said pipe, the external peripheral wall surface of said cylindrical body portion being frusto-conical, the smaller diameter being at the end thereof adjacent said flange and being substantially equal to the inside diameter of said pipe, said protecting ring having a longitudinal slot extending through said flange and body portion said slot having a width equal to $\pi$ times the difference between the larger and smaller diameters of said body portion to permit compression of said protecting ring for accommodation of said body portion within said pipe.

2. The pipe end protecting ring according to claim 1 wherein the taper of the surface of the body portion is from 1 in 10 to 1 in 40.

3. The pipe end protecting ring according to claim 1 wherein the length of the ring is from 15% to 40% of the outside diameter of the pipe to be protected.

4. The pipe end protecting ring according to claim 1 wherein the wall thickness of said body portion is ½ to 2 times as large as the wall thickness of the pipe to be protected.

5. The removable pipe end protecting ring according to claim 1 in which the end of said body portion remote from said flange is bevelled to facilitate forced entry and compression of the ring, the bevel being such that the radially inward edge of the ring end is of the greater axial extent.

6. The removable pipe end protecting ring according to claim 1 in which the margins of the slot are substantially parallel when the ring is in unapplied condition, and the walls of the tapered body portion are of uniform thickness.

References Cited
UNITED STATES PATENTS

| | | | |
|---|---|---|---|
| 1,783,893 | 12/1930 | Unke | 138—96 |
| 1,980,364 | 11/1934 | Thomas | 138—96 |
| 2,954,804 | 10/1960 | Heil | 138—96 |

LAVERNE D. GEIGER, *Primary Examiner.*

BRADFORD KILE, *Assistant Examiner.*